(12) United States Patent
Kawatsu

(10) Patent No.: US 10,491,766 B2
(45) Date of Patent: Nov. 26, 2019

(54) IMAGE READING APPARATUS AND IMAGE FORMING SYSTEM

(71) Applicant: KONICA MINOLTA, INC., Chiyoda-ku, Tokyo (JP)

(72) Inventor: Kenji Kawatsu, Kodaira (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/920,523

(22) Filed: Mar. 14, 2018

(65) Prior Publication Data
US 2018/0288252 A1    Oct. 4, 2018

(30) Foreign Application Priority Data

Mar. 28, 2017    (JP) ................................ 2017-062810

(51) Int. Cl.
*H04N 1/00* (2006.01)
*G03G 15/00* (2006.01)
(Continued)

(52) U.S. Cl.
CPC ......... *H04N 1/00549* (2013.01); *B65H 5/062* (2013.01); *G03G 15/5025* (2013.01);
(Continued)

(58) Field of Classification Search
CPC .................................................. H04N 1/00549
See application file for complete search history.

(56) References Cited

U.S. PATENT DOCUMENTS 4,686,581 A * 8/1987 Spehrley, Jr. ............ H04N 1/03
358/494
4,774,533 A * 9/1988 Muller ............... H04N 1/00519
346/145

(Continued)

FOREIGN PATENT DOCUMENTS

JP    2001-302064 A    10/2001
JP    2005-123777 A    5/2005
(Continued)

OTHER PUBLICATIONS

Office Action (Notification of Reasons for Refusal) dated Mar. 5, 2019, by the Japan Patent Office in corresponding Japanese Patent Application No. 2017-062810 and English translation of the Office Action. (15 pages).

(Continued)

*Primary Examiner* — Ted W Barnes
(74) *Attorney, Agent, or Firm* — Buchanan Ingersoll & Rooney PC

(57) ABSTRACT

An image reading apparatus includes a reader, a conveying path, a conveyer, a conveyer housing, and a frame. The conveying path guides the sheet having the image to a reading position and guides the sheet read by the reader in an ejecting direction. The conveyer conveys the sheet along the conveying path. The conveyer housing supports the conveying path and the conveyer. The frame comprises columns and beams that connect adjacent columns. The frame individually fixes the reader and the conveyer housing. The columns are provided with resilient conveying-housing fixing members, the conveying-housing fixing members each having a length smaller than the distance between adjacent columns. The conveying-housing fixing members comprise a material having rigidity lower than the material of the beams. The conveyer housing is fixed to the (Continued)

frame by the conveying-housing fixing members. The reader is fixed to the beams.

10 Claims, 5 Drawing Sheets

(51) Int. Cl.
    *H04N 1/12*           (2006.01)
    *B65H 5/06*           (2006.01)
    *H04N 1/60*           (2006.01)
    *G03G 21/16*          (2006.01)

(52) U.S. Cl.
    CPC ..... *G03G 15/5062* (2013.01); *G03G 15/6529* (2013.01); *H04N 1/00559* (2013.01); *H04N 1/123* (2013.01); *B65H 2801/06* (2013.01); *G03G 21/1695* (2013.01); *G03G 2215/00067* (2013.01); *H04N 1/6019* (2013.01)

(56) References Cited

U.S. PATENT DOCUMENTS

| | | | | |
|---|---|---|---|---|
| 4,792,858 A * | 12/1988 | Landsman | ......... | H04N 1/00681 |
| | | | | 358/494 |
| 4,833,325 A * | 5/1989 | Torii | ................ | H04N 1/00519 |
| | | | | 250/584 |
| 5,539,447 A | 7/1996 | Akuta et al. | | |
| 5,912,746 A * | 6/1999 | Cilke | ................ | H04N 1/0311 |
| | | | | 250/208.1 |
| 6,301,023 B1 * | 10/2001 | Hirai | ................ | H04N 1/00002 |
| | | | | 346/139 A |
| 6,332,598 B1 * | 12/2001 | Tsuji | ................ | H04N 1/00549 |
| | | | | 248/560 |
| 7,110,145 B2 * | 9/2006 | Tsukinowa | ............. | H04N 1/121 |
| | | | | 358/474 |
| 2001/0019402 A1 | 9/2001 | Tanabe | | |
| 2003/0063330 A1 * | 4/2003 | Hayashi | ............ | H04N 1/00519 |
| | | | | 358/474 |
| 2005/0094218 A1 * | 5/2005 | Ando | ...................... | F16F 15/04 |
| | | | | 358/474 |
| 2007/0145311 A1 * | 6/2007 | Price | .................... | G03B 42/045 |
| | | | | 250/584 |
| 2012/0320396 A1 * | 12/2012 | Kurahashi | .......... | H04N 1/00549 |
| | | | | 358/1.13 |

FOREIGN PATENT DOCUMENTS

| | | |
|---|---|---|
| JP | 2008-139394 A | 6/2008 |
| JP | 2008-141303 A | 6/2008 |
| JP | 2011-209311 A | 10/2011 |
| JP | 2016-001814 A | 1/2016 |

OTHER PUBLICATIONS

Office Action (Communication pursuant to Article 94(3) EPC) dated Aug. 14, 2019, by the European Patent Office in corresponding European Patent Application No. 18160046.1. (7 pages).

* cited by examiner

IMAGE READING APPARATUS AND IMAGE FORMING SYSTEM

BACKGROUND

1. Technological Field

The present invention relates to an image reading apparatus and an image forming system including the image reading apparatus.

2. Description of the Related Art

A typical electrophotographic image forming apparatus forms a reference image for image quality control on a sheet, reads the reference image with a reader, and modifies the conditions for forming images in accordance with the read values acquired through reading of the reference image, to achieve uniform image quality.

The reader is provided with an image sensor (charged coupled device (CCD)), a lighting unit (light emitting diode (LED)) illuminating the sheet, and an optical system (including mirrors and a lens) for focusing the light incident on the sheet from the lighting unit on the image sensor.

Vibration of the image sensor or the mirrors of the reader causes a wavy read image or a shift in the reading position, leading to inaccurate reading of the image on the sheet.

Vibration sources of the reader include 1) collision of the leading edge of a sheet with conveying guides or other components; 2) impact of a sheet entering conveying rollers or impact of a sheet ejected from the conveying rollers; 3) a motor driving the conveying rollers; and 4) a fan motor for cooling disposed in the apparatus.

A typical reader based on an optical reduction system focuses an image on an image sensor, such as a CCD, by reflecting the optical axis at a mirror, to achieved compatibility between a light path having a satisfactory length and reduced dimensions of the reader.

The length of the mirror is determined based on the width of the sheet to be read. The mirror should be fixed at a position outside the reading region. Thus, the two edges of the mirror are usually supported on a panel.

As a result, a reader is more vulnerable to vibration as the number of mirrors increases or the width of the sheet to be read increases.

A possible configuration is the support of the mirror in the central area of the back face. However, such a configuration causes distortion of the mirror and thus has an adverse effect on the image to be read.

An image reading apparatus should be provided with components for conveying sheets, such as conveying rollers conveying the sheets, a driving motor driving the conveying motors, and conveying guides guiding the sheets being conveyed.

An example apparatus including such sheet conveying components is disclosed (for example, refer to Japanese Patent Application Laid-Open Publication No. 2005-123777). The apparatus includes a housing of a reader (scanner) fixed to the apparatus with a packing. In this publication, a conveying system including sheet conveying components is directly placed on a reader.

While a sheet is conveyed by driving the conveying rollers with the conveying motor, vibration occurs due to various factors, such as the vibration of the driving motor, the vibration of gears and pulleys transmitting the rotation of the driving motor to the conveying rollers, the rotational vibration of the conveying rollers, and collision of the sheet with the conveying guides.

In the configuration disclosed in this publication, the conveying system is directly placed on the reader. Thus, the vibration caused by the various factors is directly propagating to the reader, hindering accurate reading of an image on a sheet.

SUMMARY

An object of the present invention, which has been conceived in light of the circumstances described above, is to provide an image reading apparatus that accurately reads an image on a sheet and an image forming system including the image reading apparatus.

To achieve at least one of the abovementioned objects, according to an aspect of the present invention, an image reading apparatus includes:

a reader which reads an image on a sheet at a predetermined reading position;

a conveying path which guides the sheet having the image to the reading position and which guides the sheet read by the reader in an ejecting direction;

a conveyer which conveys the sheet along the conveying path;

a conveyer driving unit which drives the conveyer;

a conveyer housing which supports the conveying path, the conveyer, and the conveyer driving unit; and a frame which includes columns and beams that connect the adjacent columns, the frame individually fixing the reader and the conveyer housing, wherein, the columns are provided with resilient conveying-housing fixing members, the conveying-housing fixing members each having a length smaller than the distance between the adjacent columns, the conveying-housing fixing members comprise a material having rigidity lower than the material of the beams, the conveyer housing is fixed to the frame by the conveying-housing fixing members, and the reader is fixed to the beams.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In the description below, the horizontal direction in FIG. 1 corresponds to the X direction, the vertical direction corresponds to the Z direction, and a direction orthogonal to the X and Z directions or the front-back direction corresponds to the Y direction.

Configuration of Image Forming System

An image forming system G according to an embodiment will now be described.

Figure 1:
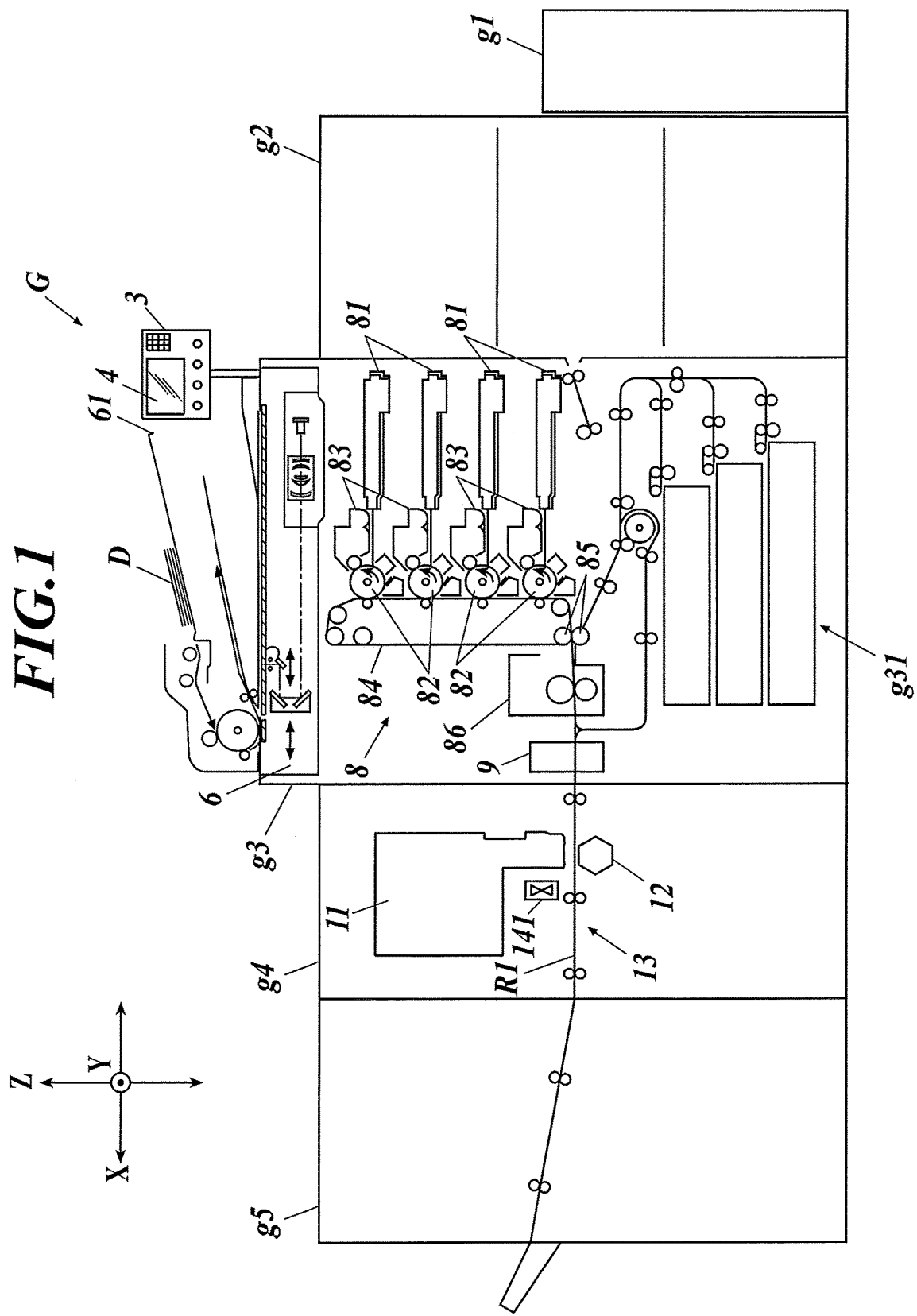
FIG. 1 is a schematic configuration diagram of an image forming system according to this embodiment.

With reference to FIG. 1, the image forming system G includes a print controller g1, a sheet feeder g2, a main unit g3, an image reading apparatus g4, and a finishing apparatus g5.

The print controller g1 receives page description language (PDL) data from a computer terminal via a network and rasterizes the PDL data into bitmap image data.

The print controller g1 generates image data for each of the colors cyan (C), magenta (M), yellow (Y), and black (K) and outputs the image data to the main unit g3.

The sheet feeder g2 includes large-volume feeder trays.

The sheet feeder g2 conveys sheets from a sheet feeder tray to the main unit g3 under an instruction from the main unit g3.

An image forming unit 8 of the main unit g3 forms an image on a sheet on the basis of image data of an original document D read by a scanner 6 or image data generated by the print controller g1. The main unit g3 conveys the sheet after the formation of the image to the image reading apparatus g4.

A reader 11 of the reading apparatus g4 reads a reference image (providing a reference for, for example, color, tone correction, line width, color resist, and/or front/back alignment) on a sheet and outputs the read image data to a hardware processor 1. The image reading apparatus g4 conveys the sheet having the image read by the reader 11 to the finishing apparatus g5.

The finishing apparatus g5 carries out post-treatment on the sheet sent from the image reading apparatus g4 and ejects the post-treated sheet. Examples of the post-treatment includes, stapling, punching, folding, and bookbinding. The post-treatment is not essential and thus the finishing apparatus g5 carries out the post-treatment only after an instruction from the main unit g3. If the post-treatment is not instructed, the finishing apparatus g5 ejects the sheet without post-treatment.

Configuration of Main Unit

The configuration of the main unit g3 will now be described.

Figure 2:
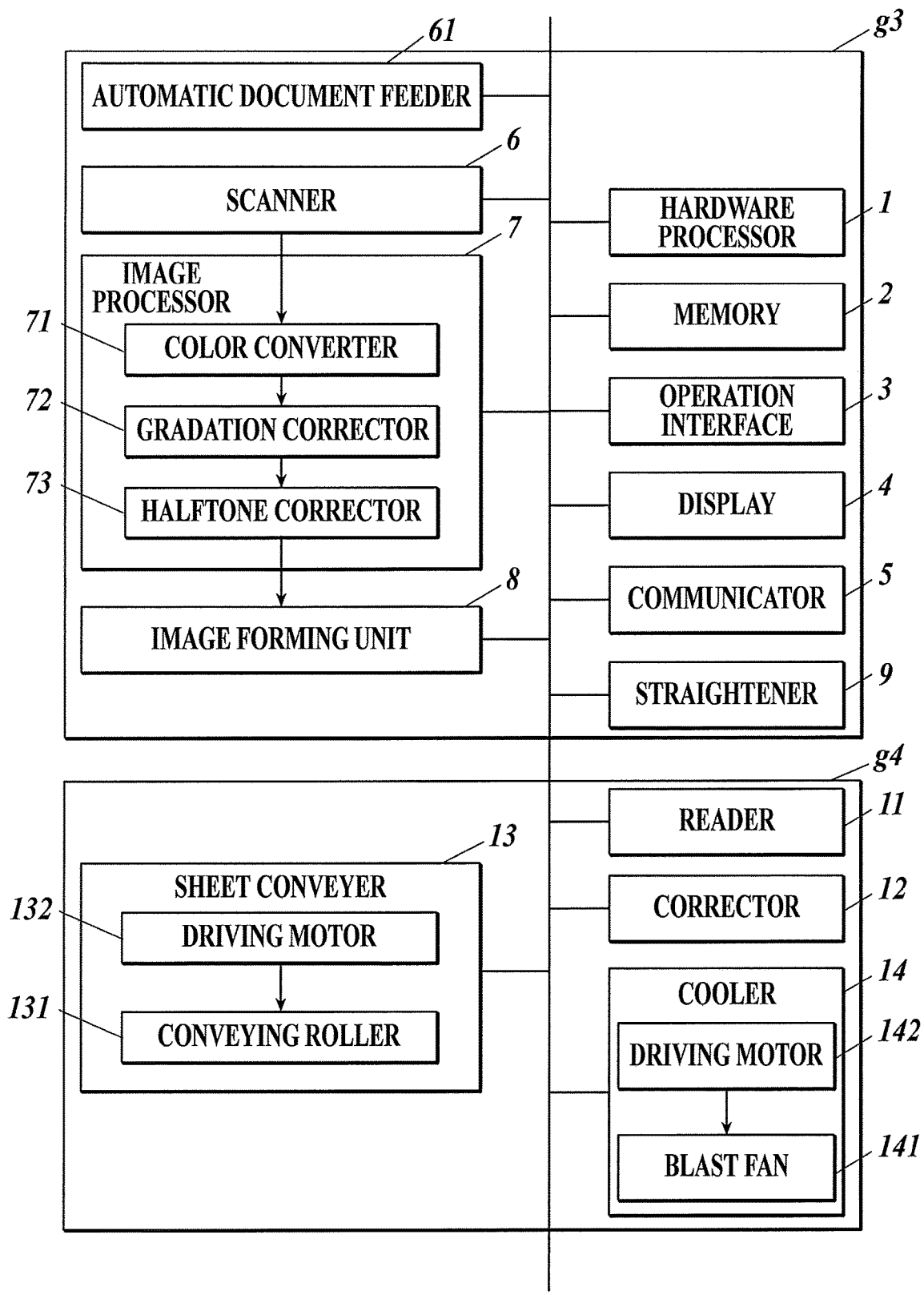
FIG. 2 is a functional block diagram of a main unit and an image reading apparatus.

With reference to FIGS. 1 and 2, the main unit g3 includes, a hardware processor 1, a memory 2, an operation interface 3, a display 4, a communicator 5, an automatic sheet feeder 61, a scanner 6, an image processor 7, an image forming unit 8, a straightener 9, and sheet feeder trays g31.

The hardware processor 1 includes a central processing unit (CPU) and a random access memory (RAM). The hardware processor 1 reads programs stored in the memory 2 and controls the components of the image forming system G in accordance with these programs.

For example, the hardware processor 1 feeds a sheet from the sheet feeder g2 or one of the sheet feeder tray g31 in response to an instruction of a job setting. The hardware processor 1 allows the image processor 7 to correct and process the image data and the image forming unit 8 to form an image. In the case where the job setting includes the post-treatment, the hardware processor 1 instructs the finishing apparatus g5 to carry out the post-treatment.

The memory 2 stores programs and files readable by the hardware processor 1. The memory 2 may be a storage medium, such as a hard disk or a read only memory (ROM). The memory 2 stores reference image data for adjustment of image quality.

The operation interface 3 includes a touch panel integrated with operating keys and the display 4 and outputs operating signals corresponding to operations of these components to the hardware processor 1. A user can operate the operation interface 3 to input instructions on modification of the job settings and processing.

The display 4 may be a liquid crystal display (LCD) and displays an operating menu and other images in accordance with instructions from the hardware processor 1.

The communicator 5 establishes communication with another computer, such as a server or another image forming system, via a network under an instruction from the hardware processor 1.

The automatic sheet feeder 61 includes a sheet tray for placing an original document D, a mechanism for conveying the original document D, and conveying rollers. The automatic sheet feeder 61 conveys the original document D to a predetermined conveying path.

The scanner 6 includes an optical system including a light source and reflection mirrors. The scanner 6 reads the image on the original document D conveyed along the predetermined conveying path or an original document D placed on a glass platen, generates an image data item for each of the colors red (R), green (G), and blue (B), and outputs the generated image data items to the image processor 7.

The image processor 7 corrects the image data from the scanner 6 or the print hardware processor g1, processes the corrected image data, and outputs the processed image data to the image forming unit 8.

With reference to FIG. 2, the image processor 7 includes a color converter 71, a tone corrector 72, and a halftone processor 73.

The color converter 71 conducts color conversion of the image data items of the colors R, G, and B from the scanner 6 and outputs image data of the colors C, M, Y, and K.

Alternatively, the color converter 71 may conduct color conversion of the image data items of the colors C, M, Y, and K from the print hardware processor g1 for color correction, and output the color-corrected image data of the colors C, M, Y, and K.

During the color conversion, the color converter 71 retrieves a lookup table (LUT) storing the color-converted tone values of the colors C, M, Y, and K in relation to the tones values of the colors R, G, and B. During the color correction, the color converter 71 retrieves an LUT storing the color-corrected tone values of the colors C, M, Y, and K in relation to the tone values of the colors C, M, Y, and K.

The tone corrector 72 corrects the tone of the image data output from the color converter 71 or the print hardware processor g1.

During the tone correction, the tone corrector 72 retrieves an LUT storing correction values in relation to tone values so as to match the tone properties of the image with target tone properties. The tone corrector 72 retrieves correction values corresponding to the tone values of the pixels in the image data, from the LUT for tone correction, and outputs image data consisting of the correction values.

The halftone processor 73 conducts halftone processing on the image data from the tone corrector 72. Examples of the halftone processing includes screen processing with a dither matrix and error diffusion.

The halftone processor 73 outputs the image data after the halftone processing to the image forming unit 8.

The image forming unit 8 forms an image on a sheet on the basis of the image data from the image processor 7.

With reference to FIG. 1, the image forming unit 8 is provided with four sets of exposing units 81, photoreceptors 82, and developing units 83 for the respective colors C, M, Y, and K. The image forming unit 8 includes an intermediate transfer belt 84, secondary transfer rollers 85, and a fixing unit 86.

Each exposing unit 81 includes laser diodes (LDs) or light emitting devices. The exposing unit 81 drives the LDs on the basis of the image data and illuminates the corresponding charged photoreceptor 82 with a laser beam for exposure. The relevant developing unit 83 feeds toner onto the photoreceptor 82 with a charged developer roller and develops an electrostatic latent image in response to the exposure on the photoreceptor 82.

The four images formed with the respective four color toners on the respective four photoreceptors 82 are sequentially transferred to the intermediate transfer belt 84. This forms a color image on the intermediate transfer belt 84. The intermediate transfer belt 84 is an endless belt wound around several rollers. The intermediate transfer belt 84 rotates in response to the rotation of the rollers.

The secondary transfer rollers 85 transfer the color image from the intermediate transfer belt 84 to the sheet fed from the sheet feeder g2 or the sheet feeder tray g31. The fixing unit 86 applies heat and pressure to the sheet to fix the color image to the sheet.

The straightener 9 corrects deformation of the sheet due to the fixing to flatten the face of the sheet. The sheet readily deforms in the fixing process and should be flattened before reading of the reference image. Thus, the straightener 9 is disposed between the fixing unit 86 and the reader 11 in the conveying direction of the sheet, as illustrated in FIG. 1.

Configuration of Image Reading Apparatus

The configuration of the image reading apparatus g4 will now be described.

The image reading apparatus g4 includes a reader 11, a corrector 12, a sheet conveyer 13, and a cooler 14.

The reader 11 reads the image formed on the sheet being conveyed along a conveying path R1 by the sheet conveyer 13, at a predetermined reading position.

Figure 3:
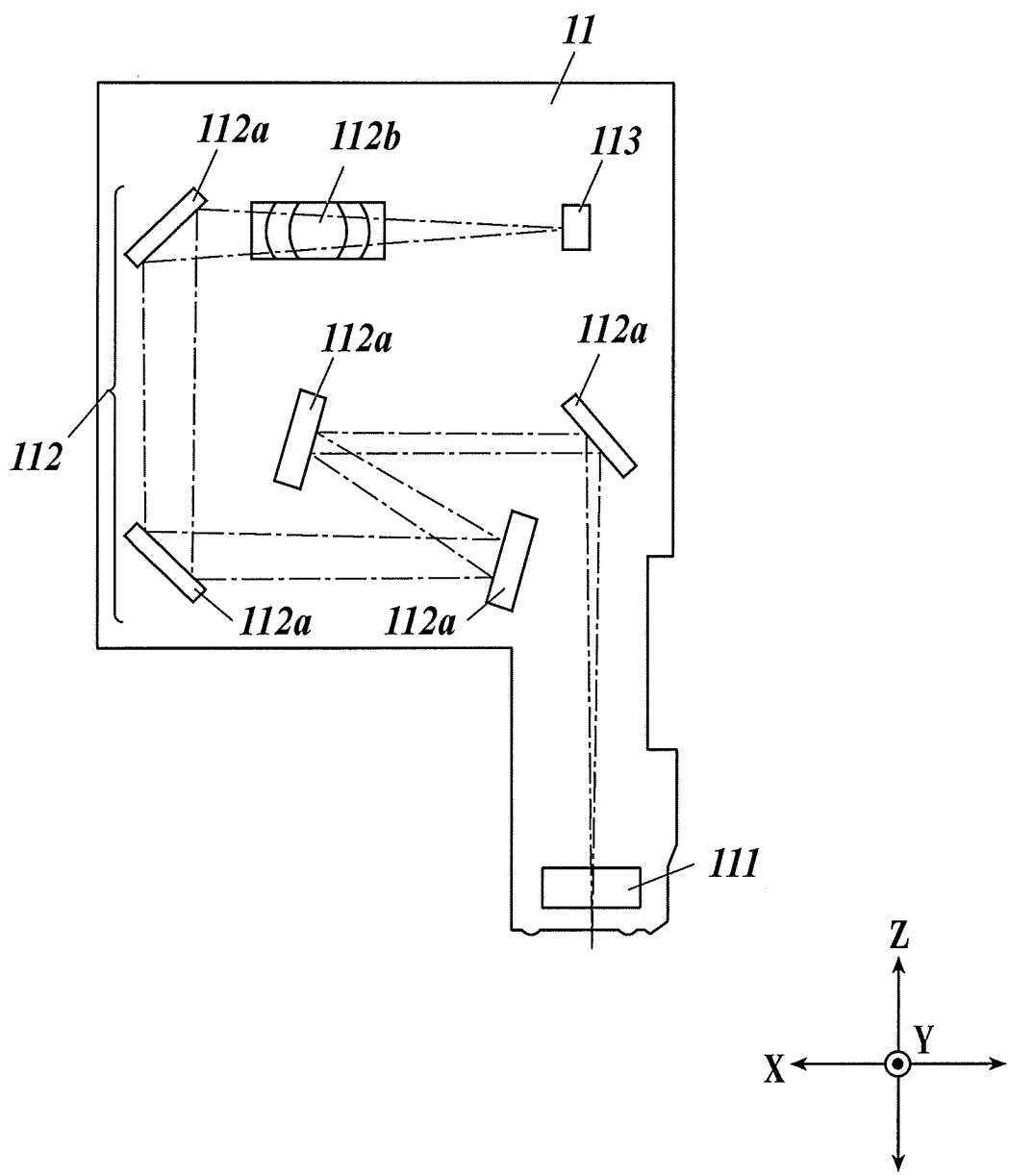
FIG. 3 is a side view of the internal configuration of an image reader.

With reference to FIGS. 1 and 3, the reader 11 includes a lighting unit 111, an optical system 112, and a CCD 113. The lighting unit 111, the optical system 112, and the CCD 113 are fixed to the interior of the housing of the reader 11.

The lighting unit 111 includes a light source, such as an LED or a halogen lamp, and illuminates the sheet conveyed by conveying rollers 131, at the reading position of the reader 11.

The optical system 112 includes mirrors 112a (five according to this embodiment) and a lens 112b. The optical system 112 focuses the light from the lighting unit 111 incident on the sheet (the image at the reading position), on the CCD 113.

The CCD 113 reads the image formed on the sheet at the predetermined reading position. The CCD 113 is a color line sensor that can read the entire length of the sheet in the width or Y direction.

The reader 11, which has the configuration described above, can sequentially read the image formed on the sheet across the entire width as the sheet passes the reading position. For example, in this embodiment, the reader 11 reads a reference image (providing a reference for, for example, color, tone correction, line width, color resist, and/or front/back alignment) formed on a sheet, and feeds back the read image data to the image processor, the print controller, and sheet conveyer for correction.

The corrector 12 is disposed below the conveying path R1 and faces the reader 11. The corrector 12 includes a white reference plate for determining the correction values for shading correction conducted during reading of the image. The white reference plate is disposed at the reading position and is read in intervals by the CCD 113 while no sheet is passing (for example, between consecutive sheets).

Figure 4:
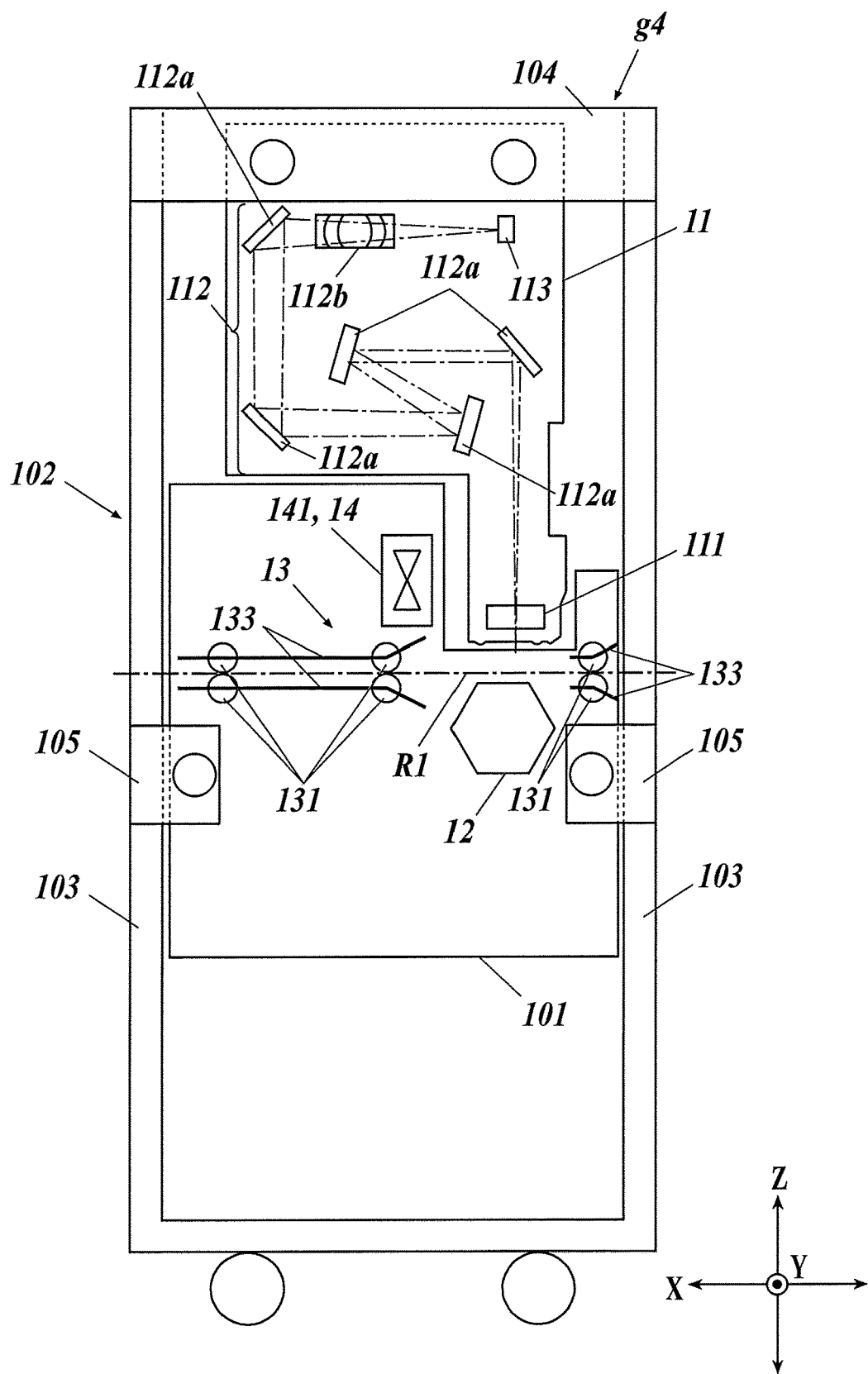
FIG. 4 is a schematic configuration diagram of the image reading apparatus.

With reference to FIGS. 2 and 4, the sheet conveyer 13 includes conveying rollers 131, a driving motor 132, and conveying guides 133.

Several conveying rollers 131 or conveyers are provided in the conveying path R1 so as to convey sheets along the conveying path R1.

The driving motor 132 or conveyer driving unit drives the conveying rollers 131 in accordance with instructions from the hardware processor 1. The driving motor 132 is disposed closer to the center of the sheet than the conveying rollers 131 in the width or Y direction.

At least two conveying guides 133 are provided in the conveying path R1 and guide the sheet conveyed by the conveying rollers 131.

During reading of the image by the reader 11, the sheet conveyer 13 conveys the sheet by the conveying rollers 131 disposed along the conveying path R1 such that the sheet passes through the reading position of the reader 11 at a predetermined rate. The sheet conveyer 13 conveys the sheet having the image read by the reader 11 to the finishing apparatus g5.

With reference to FIGS. 2 and 4, the cooler 14 includes a blast fan 141 that blows in a predetermined direction and a driving motor 142 that drives the blast fan 141. The driving motor 142 is disposed closer to the center of the sheet than the blast fan 141 in the width or Y direction.

The cooler 14 is fixed to a conveyer housing 101 such that the blast fan 141 faces the lighting unit 111. In this way, the cooler 14 can blow the lighting unit 111 so as to cool the lighting unit 111.

With reference to FIG. 4, the conveying path R1, which is defined by the conveying guides 133 and the bottom face of the reader 11, extends in a substantially linear line. The conveying path R1 guides the sheet having an image to the reading position and then guides the sheet in the ejecting direction after reading by the reader 11.

The corrector 12, the sheet conveyer 13 (the conveying rollers 131 and the driving motor 132), the cooler 14, and the conveying path R1 of the image reading apparatus g4 are fixed to the conveyer housing 101, except for the reader 11.

The reader 11 and the conveyer housing 101 are separately fixed to a frame 102.

The configuration described above causes the vibration caused by collision of the sheet with the components such as the conveying guides 133 and the conveying rollers 131 to be transmitted to the conveyer housing 101, the frame 102, and the reader 11, in this order. This provides a sufficient length for the vibration to attenuate before it reaches the reader 11.

The reader 11 and the conveyer housing 101 are movable relative to the frame 102. In detail, the reader 11 and the conveyer housing 101 can be pulled out from the frame 102.

The reader 11 removable from the frame 102 allows ready replacement of the reader 11 in the case of failure of the reader 11.

The conveyer housing 101 removable from the frame 102 allows ready removal of a sheet in the case of jamming of the sheet in the conveying path R1.

Figure 5:
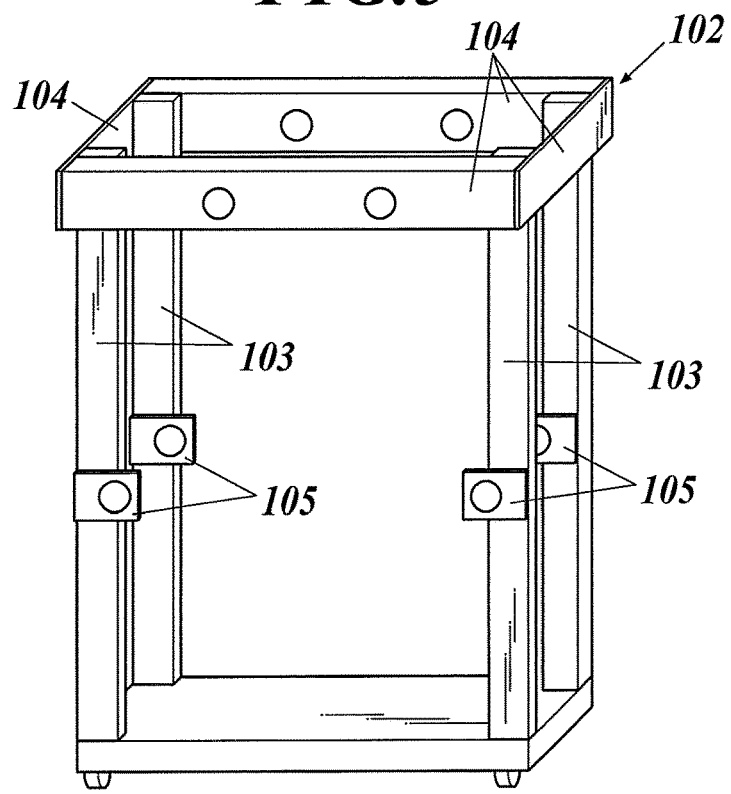
FIG. 5 is a schematic configuration diagram of a frame.

With reference to FIG. 5, the frame 102 includes columns 103 (four in this embodiment) and beams 104 connecting the adjacent columns 103. The columns 103 and the beams 104 are, for example, metal plates or pipes. The columns 103 and the beams 104 may be composed of any material that has a sufficient strength. Examples of such a material include steel and stainless steel.

The frame 102 should not resonate with the conveyer housing 101 supporting the conveying rollers 131, the driving motor 132, and the conveying path R1, which are vibration sources. Thus, the resonant frequency of the frame 102 should not be the operating frequency of the conveyer housing 101. The frame 102 should have appropriate rigidity for supporting the conveyer housing 101 and the reader 11. Thus, the frame 102 should have high rigidity (i.e., high natural frequency).

In this embodiment, the columns 103 serving as an external frame of the image reading apparatus g4 are connected by the beams 104, to enhance the rigidity of the frame 102.

The reader 11 is fixed to the beams 104. This is because the reader 11 includes mirrors 112a having a low natural frequency of approximately 80 Hz and should be fixed to the frame 102 having a high natural frequency or high rigidity so that vibration does not propagate to the mirrors having a low natural frequency.

In this embodiment, the reader 11 is fixed to the beams 104 of the frame 102 to prevent propagation of vibration from the frame 102 to the reader 11.

The columns 103 are provided with conveying-housing fixing members 105 that fix the conveyer housing 101 to the frame 102. Each of the conveying-housing fixing members 105 has a length smaller than the distance between the adjacent columns 103. Thus, the configuration according to this embodiment can prevent propagation of vibration from the conveyer housing 101 to the frame 102 because the columns 103 are not connected with the conveying-housing fixing members 105.

The conveying-housing fixing members 105 are resilient components, such as springs. The conveying-housing fixing members 105 fix the conveyer housing 101 including vibration sources to the frame 102. The conveying-housing fixing members 105 are composed of a material having rigidity lower than that of the beams 104. The spring constant of the conveying-housing fixing members 105 is adjusted such that the displacement caused by the weight of the conveyer housing 101 is no more than 1 mm. In this embodiment, the conveying-housing fixing members 105 are metal plates.

In this embodiment, the weight of the conveyer housing 101 is increased by supporting the mechanism for conveying (including the conveying rollers 131, the driving motor 132, and the conveying path R1). The increased weight reduces the natural frequency of the conveyer housing 101.

As described above, the conveyer housing 101, which includes vibration sources, is supported by resilient components, and the weight of the conveyer housing 101 is increased to lower the natural frequency. This attenuates the vibration propagating from the conveyer housing 101, and thus isolates the vibration.

In general, the relative displacement of the reader 11 and the sheet being conveyed in the image reading apparatus g4 should be within approximately 1 mm so as to achieve accurate reading of an image. For example, in the case where the reader 11 and the conveyer housing 101 are positioned with dampers composed of rubber having low strength, the relative displacement increases. Thus, the reader 11 and the conveyer housing 101 cannot be relatively positioned with high precision.

In this embodiment, the conveying-housing fixing members 105 are metal plates having an appropriate strength. Thus, the relative displacement is small compared to that in a configuration of the reader 11 and the conveyer housing 101 positioned with dampers.

In this embodiment, the spring constant of the conveying-housing fixing members 105 is adjusted such that the displacement caused by the weight of the conveyer housing 101 is no more than 1 mm.

In this way, the relative displacement of the reader 11 and the sheet being conveyed does not exceed 1 mm.

Advantageous Effects

As described above, the image reading apparatus g4 of the image forming system G according to this embodiment includes:

a reader 11 reading an image on a sheet at a predetermined reading position;

a conveying path R1 guiding the sheet having the image to the reading position and guiding the sheet in the ejecting direction after reading by the reader 11;

a conveyer or conveying rollers 131 conveying the sheet along the conveying path R1;

a conveyer driving unit or driving motor 132 driving the conveyer;

a conveyer housing 101 supporting the conveying path R1, the conveyer, and the conveyer driving unit; and a frame 102 including columns 103 and beams 104 that connect the adjacent columns 103 and individually fixing the reader 11 and the conveyer housing 101.

The columns 103 are provided with resilient conveying-housing fixing members 105 having a length smaller than the distance between the adjacent columns 103. The conveying-housing fixing members 105 are composed of a material having rigidity lower than that of the beams 104. The conveyer housing 101 is fixed to the frame 102 with the conveying-housing fixing members 105, and the reader 11 is fixed to the beams 104.

In the image reading apparatus g4 according to this embodiment, the reader 11 is fixed to the frame 102 having high rigidity. This prevents the propagation of vibration from the frame 102 to the reader 11.

The columns 103 are not connected with the conveying-housing fixing members 105. Thus, vibration can be prevented from propagating from the conveyer housing 101 to the frame 102.

The conveyer housing 101 including vibration sources is supported by resilient components, and the weight of the conveyer housing 101 is increased to lower the natural frequency. This attenuates the vibration propagating from the conveyer housing 101, and thus isolates the vibration.

Thus, in the image reading apparatus g4 according to this embodiment, propagation of vibration to the reader 11 can be prevented. This enables accurate reading of an image on a sheet.

The conveying-housing fixing members 105 of the image reading apparatus g4 according to this embodiment are metal plates.

Thus, in the image reading apparatus g4 according to this embodiment, the relative displacement of the reader 11 and the sheet being conveyed can be reduced. Thus, the reader 11 and the conveyer housing 101 can be relatively positioned with high precision. Moreover, the vibration propagating from the conveyer housing 101 can be attenuated. This can isolate the vibration.

The reader 11 and the conveyer housing 101 of the image reading apparatus g4 according to this embodiment are movable relative to the frame 102.

Thus, in the image reading apparatus g4 according to this embodiment, the reader 11 can be readily replaced in the case of failure of the reader 11. This reduces downtime and enhances productivity. In the case of jamming of a sheet in the conveying path R1, the jammed sheet can be readily removed. This reduces downtime and enhances productivity.

In the image reading apparatus g4 according to this embodiment, the spring constant of the conveying-housing fixing members 105 is adjusted such that the displacement caused by the weight of the conveyer housing 101 is no more than 1 mm.

Thus, in the image reading apparatus g4 according to this embodiment, the relative displacement of the reader 11 and the sheet being conveyed is not more than 1 mm. This achieves high accuracy in reading of an image.

The embodiments of the present invention have been described in detail. The embodiments should not be construed to limit the scope of the invention and may be modified within the scope of the invention.

Modifications

For example, in the embodiment described above, the reader 11 faces the corrector 12 across the conveying path R1, where reader 11 is disposed above and the corrector 12 is disposed below the conveying path R1. Alternatively, the reader 11 and the corrector 12 may be disposed at any positions. For example, the corrector 12 may face the reader 11 across the conveying path R1, where the corrector 12 is disposed above and the reader 11 disposed below the conveying path R1.

Figure 6:
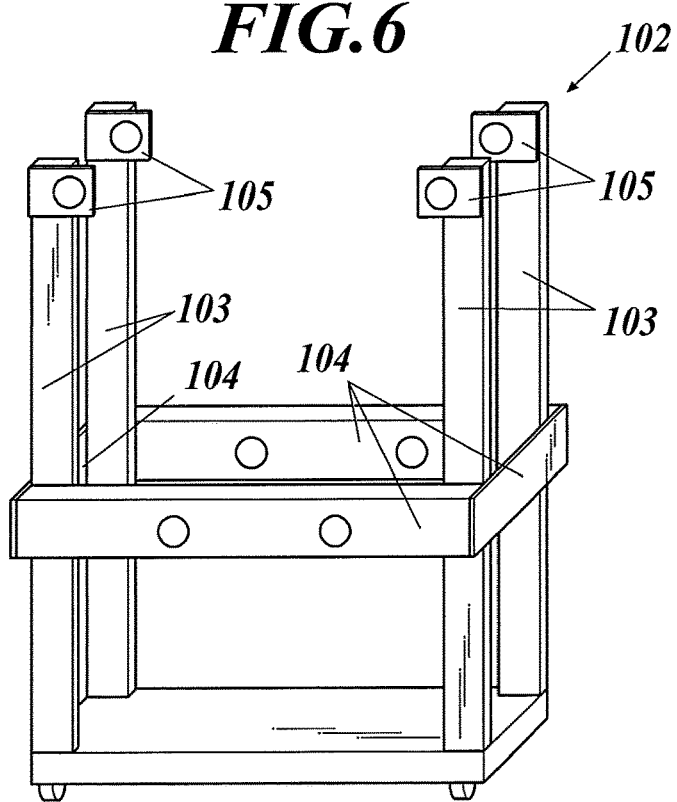
FIG. 6 is a schematic configuration diagram of another frame.

In the case where the corrector 12 faces the reader 11 across the conveying path R1, where the corrector 12 is disposed above the conveying path R1 and the reader 11 is disposed below, the position of the beams 104 fixing the reader 11 may be interchanged with the position of the conveying-housing fixing members 105 fixing the conveyer housing 101, as illustrated in FIG. 6.

In the embodiment described above, one reader 11 and one corrector 12 are provided. Alternatively, any number of the reader 11 and the corrector 12 may be provided. For example, two readers 11 and two correctors 12 may be provided. In such a case, one of the readers 11 faces one of the correctors 12 across the conveying path R1, where the reader 11 is disposed above the conveying path R1 and the correctors 12 is disposed below the conveying path R1, whereas the other reader 11 faces the other corrector 12 across the conveying path R1, where the other reader 11 is disposed below the conveying path R1 and the other corrector 12 is disposed above the conveying path R1. In this way, each pair of the reader 11 and the corrector 12 can read each side of a sheet, so that both sides of a sheet are read in a single operation.

In the embodiment described above, the conveying-housing fixing members 105 are metal plates. Alternatively, the conveying-housing fixing members 105 may be composed of any other material. In detail, the conveying-housing fixing members 105 may be composed of any material having resilience and strength sufficient for relatively positioning the reader 11 and the sheet being conveyed with high precision. An example of such a material includes reinforced resin.

In the embodiment described above, the adjacent columns 103 are connected with the beams 104 at all four sides. Alternatively, the beams 104 may connect the columns 103 at less than four sides. Although connecting the columns 103 with the beams 104 at all four sides is preferred in consideration of high rigidity of the frame 102, the beams 104 may connect the columns 103 in at least the directions parallel to the conveying direction.

In the embodiment described above, the conveying path R1 has a substantially linear shape. Alternatively, the conveying path R1 may have any other shape. In specific, the conveying path R1 may include a curved portion.

In the embodiment described above, the housing of the reader 11 has an L shape, that is, a bottom face downward protrusion (on the right in the drawing). Alternatively, the housing of the reader 11 may have any other shape. In specific, the housing of the reader 11 may have any shape that can provide a light path long enough for reading. For example, the housing of the reader 11 may have a shape of a box with no downward protrusion. Alternatively, the housing of the reader 11 may have a downward protrusion in the central region of the bottom face. In such a case, it is preferred that the contact area of the bottom face of the reader 11, which also defines the conveying path R1, and the sheet be small (for example, the bottom face have a protrusion at the edge or in the central area) so as to prevent vibration caused by contact of the bottom face of the reader 11 and the sheet.

The detailed configuration and operation of the components of the image forming system described above may be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017-062810, filed on Mar. 28, 2017, is incorporated herein by reference in its entirety.

What is claimed is:

1. An image reading apparatus, comprising:
   a reader which reads an image on a sheet at a predetermined reading position;
   a conveying path which guides the sheet having the image to the reading position and which guides the sheet read by the reader in an ejecting direction;
   a conveyer which conveys the sheet along the conveying path;
   a conveyer driving unit which drives the conveyer;
   a conveyer housing which supports the conveying path, the conveyer, and the conveyer driving unit; and
   a frame which comprises columns and beams that connect the adjacent columns, the frame individually fixing the reader and the conveyer housing, wherein,
   the columns are provided with resilient conveying-housing fixing members, the conveying-housing fixing members each having a length smaller than the distance between the adjacent columns,
   the conveying-housing fixing members comprise a material having rigidity lower than the material of the beams,
   the conveyer housing is fixed to the frame by the conveying-housing fixing members, and
   the reader is fixed to the beams.

2. The image reading apparatus according to claim 1, wherein the conveying-housing fixing members comprise metal plates.

3. The image reading apparatus according to claim 1, wherein the reader and the conveyer housing are movable relative to the frame.

4. The image reading apparatus according to claim 1, wherein the spring constant of the conveying-housing fixing members is adjusted to achieve a displacement of 1 mm or less caused by the weight of the conveyer housing.

5. The image reading apparatus according to claim 1, wherein a portion of the reader defines the conveying path.

6. The image reading apparatus according to claim 1, wherein the columns and the beams comprise metal plates.

7. The image reading apparatus according to claim 1, wherein,
    the columns comprise four columns, and the beams comprise four beams, and each of the four beams connect the adjacent columns of the frame.

8. The image reading apparatus according to claim 1, wherein the conveying path comprises a curved portion.

9. The image reading apparatus according to claim 1, wherein the housing of the reader partially protrudes toward the sheet.

10. An image forming system comprising:
    an image forming unit which forms an image based on image data; and
    the image reading apparatus according to claim 1 which reads the image formed by the image forming unit on a sheet.

\* \* \* \* \*